US011277775B2

(12) United States Patent
Vikberg et al.

(10) Patent No.: US 11,277,775 B2
(45) Date of Patent: Mar. 15, 2022

(54) SINGLE RADIO VOICE CALL CONTINUITY FOR 5GC

(71) Applicant: Telefonaktiebolaget LM Ericsson (publ), Stockholm (SE)

(72) Inventors: Jari Vikberg, Järna (SE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 13 days.

(21) Appl. No.: 16/772,704

(22) PCT Filed: Dec. 13, 2017

(86) PCT No.: PCT/SE2017/051265
§ 371 (c)(1),
(2) Date: Jun. 12, 2020

(87) PCT Pub. No.: WO2019/117768
PCT Pub. Date: Jun. 20, 2019

(65) Prior Publication Data
US 2020/0329404 A1 Oct. 15, 2020

(51) Int. Cl.
*H04W 36/00* (2009.01)
(52) U.S. Cl.
CPC ... *H04W 36/0022* (2013.01); *H04W 36/0038* (2013.01)
(58) Field of Classification Search
None
See application file for complete search history.

(56) References Cited

U.S. PATENT DOCUMENTS

| 2010/0135246 A1 | 6/2010 | Hallental |
| 2011/0230193 A1* | 9/2011 | Vikberg ............ H04W 36/0022 455/436 |

(Continued)

OTHER PUBLICATIONS

Author Unknown, "Technical Specification Group Services and System Aspects; Single Radio Voice Call Continuity (SRVCC); Stage 2 (Release 15)," Technical Specification 23.216, Version 15.0.0, 3GPP Organizational Partners, Sep. 2017, 69 pages.

(Continued)

*Primary Examiner* — Kenny S Lin
(74) *Attorney, Agent, or Firm* — Withrow & Terranova, PLLC

(57) ABSTRACT

A Network Function service provider in a 5GC, for managing SRVCC handover for a UE having a voice session anchored in an IMS in a PS domain in the 5GC is provided. The SRVCC handover moves the voice session to a CS domain in a legacy network. The NF service provider receives an SRVCC handover required message from an NF service consumer, comprising information about a target ID of the legacy network and a target transparent RAN container. The NF service provider obtains, based on the information received in the handover required message, a legacy target transparent RAN container comprising information required for the target RAN node in the legacy radio access network to accept the handover, an identifier related to the voice session, an STN-SR and legacy CS domain security information. The NF service provider initiates handover by transmitting the obtained information to the legacy CN over Sv-interface.

31 Claims, 6 Drawing Sheets

(56) References Cited

U.S. PATENT DOCUMENTS

| | | | |
|---|---|---|---|
| 2013/0272194 A1* | 10/2013 | Keller | H04W 76/10 370/328 |
| 2013/0294407 A1* | 11/2013 | Mutikainen | H04L 65/1016 370/331 |
| 2016/0150446 A1* | 5/2016 | Kallio | H04L 65/1069 370/331 |
| 2017/0188270 A1* | 6/2017 | Shan | H04L 65/103 |
| 2017/0289859 A1 | 10/2017 | Stenfelt et al. | |
| 2019/0297538 A1* | 9/2019 | Keller | H04W 36/0022 |
| 2020/0305033 A1* | 9/2020 | Keller | H04L 65/1016 |

OTHER PUBLICATIONS

Author Unknown, "Technical Specification Group Services and System Aspects; IP Multimedia Subsystem (IMS) Service Continuity; Stage 2 (Release 15)," Technical Specification 23.237, Version 15.0.0, 3GPP Organizational Partners, Sep. 2017, 182 pages.

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.1.0, 3GPP Organizational Partners, Sep. 2017, 397 pages.

Author Unknown, "Technical Specification Group Services and System Aspects; System Architecture for the 5G System; Stage 2 (Release 15)," Technical Specification 23.501, Version 1.4.0, 3GPP Organizational Partners, Sep. 2017, 151 pages.

Author Unknown, "Technical Specification Group Services and System Aspects; Procedures for the 5G System; Stage 2 (Release 15)," Technical Specification 23.502, Version 1.2.0, 3GPP Organizational Partners, Sep. 2017, 165 pages.

Author Unknown, "Technical Specification Group Radio Access Network; UTRAN Iu interface Radio Access Network Application Part (RANAP) signalling (Release 14)," Technical Specification 25.413, Version 14.1.0, 3GPP Organizational Partners, Jun. 2017, 455 pages.

Author Unknown, "Technical Specification Group Radio Access Network; Mobile Switching Centre—Base Station System (MSC-BSS) interface; Layer 3 specification (Release 14)," Technical Specification 48.008, Version 14.2.0, 3GPP Organizational Partners, Sep. 2017, 239 pages.

China Unicom, et al., "R1-174157: Potential implementations of voice service continuity from 5G to 2/3G," Third Generation Partnership Project (3GPP), TSG-SA WG1 Meeting #80, Nov. 25-Dec. 1, 2017, 6 pages, Reno, USA.

International Search Report and Written Opinion for International Patent Application No. PCT/SE2017/051265, dated Jun. 6, 2018, 16 pages.

* cited by examiner

SINGLE RADIO VOICE CALL CONTINUITY FOR 5GC

This application is a 35 U.S.C. § 371 national phase filing of International Application No. PCT/SE2017/051265, filed Dec. 13, 2017, the disclosure of which is incorporated herein by reference in its entirety.

TECHNICAL FIELD

Embodiments herein relate to a Network Function (NF) service provider and an NF service consumer and methods performed therein for managing Single Radio Voice Call Continuity from a 5G network to a legacy network. Furthermore, a computer program and a computer readable storage medium are also provided herein.

BACKGROUND

In a typical wireless communication network, wireless devices, also known as wireless communication devices, mobile stations, stations (STA) and/or User Equipment (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core network nodes and in some cases even to different core networks, e.g. in RAN sharing deployments.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched (PS) Domain.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of W-Fi hotspots. 5G research and development also aims at improved support of machine to machine communication, also known as the Internet of things, aiming at lower cost, lower battery consumption and lower latency than 4G equipment.

Although, high data rates and low latency is becoming increasingly important in most cases, there remains a need to guarantee the quality of active voice calls. As a consequence of the higher data rates, the coverage areas of cells in newer communication technologies are often smaller than for legacy cells. In order to avoid a voice call from being dropped when a UE leaves the coverage area of e.g. a 5G radio access network, which would lead to an unacceptable Quality of Experience (QoE) for the end user, the voice session of the UE may be handed over to a legacy 2G/3G coverage.

Standardization work is ongoing on NG-RAN and 5GC as new radio access and new packet core network, see e.g. 3GPP specifications 23.501 and 23.502 for stage 2.

For Single Radio Voice Call Continuity (SRVCC) from EPS to 2G/3G, a bearer splitting function is used to split the voice and other Guaranteed Bit Rate (GBR) bearers, such as e.g. bearers used for video media, from the other bearers that are used on EPS. GBR bearers cannot be transferred to a 2G/3G packet switched (PS) domain because there is no support for GBR in the 2G/3G PS domain. Only the remaining non GBR bearers, e.g. for signaling and for internet access can be transferred to 2G/3G PS access. If the voice or other GBR bearers would be included, the handover may be rejected. The SRVCC is further described in 3GPP Rel-15 TS 23.216 v15.0.0 and Rel-15 TS 23.237 v15.0.0. In EPS a plurality of nodes are involved in the handover and bearer splitting and affects a Mobility Management Entity (MME), a Packet Gateway (PGVV) and a Policy and Charging Control (PCC). The bearer splitting functionality is quite complex and therefore puts a burden on the capacity of the nodes handling the bearer splitting and handover from EPS to 2G/3G.

China Unicorn, et al., "Potential implementations of voice service continuity from 5G to 2/3G", 3GPP draft, S1-174157, 3GPP TSG-SA WG1 Meeting #80, Reno, USA, 25 Nov.-1 Dec. 2017 discloses potential implementations of voice service continuity from 5G to GERAN or UTRAN.

"3$^{rd}$ Generation Partnership Project; Technical Specification Group Services and System Aspects; Single Radio Voice Call Continuity (SRVCC); Stage 2 (Release 15)," 3GPP Technical Specification (TS) 23.216, Version 15.0.0

(2017 September 9) discloses an architecture enhancement for SRVCC between access systems for voice call that are anchored in the IMS.

SUMMARY

An object of embodiments herein is to provide a method for managing Single Radio Voice Call Continuity (SRVCC) handover which reduces the complexity and improves the performance of the communications network in an efficient manner.

According to a first aspect of embodiments herein, the object is achieved by a method performed by a Network Function (NF) service provider in a 5G core network, for managing SRVCC handover for a UE. The UE has a voice session anchored in an IP-Multimedia Subsystem (IMS) in a packet switched (PS) domain in the 5G core network and in a 5G radio access network. The SRVCC handover moves the voice session to a circuit switched (CS) domain in a legacy core network and radio access network. The NF service provider receives an SRVCC handover required message from an NF service consumer. The message comprises an indication that a SRVCC handover is to be performed, information about a target ID of the legacy network and a target transparent Radio Access Network (RAN) container comprising information required for a target radio access network node in the legacy radio access network to accept the handover. The target ID indicates where the handover should be routed to and within the legacy core network and radio access network. The NF service provider obtains, based on the information received in the handover required message, a legacy target transparent RAN container comprising information required for the target radio access network node in the legacy radio access network to accept the handover, an identifier related to the voice session, a session transfer number for SRVCC (STN-SR) and legacy CS domain security information. The NF service provider initiates the handover by transmitting the obtained information to the legacy core network over an Sv-interface.

According to a second aspect of embodiments herein, the object is achieved by a method performed by an NF service consumer in a 5G core network for managing SRVCC handover for a UE. The UE has a voice session anchored in an IMS, in a PS domain in the 5G core network and in a 5G radio access network. The SRVCC handover moves the voice session to a CS domain in a legacy core network and radio access network. The NF service consumer obtains, from a node in the 5G radio access network, a handover required message. The message comprises an indication that SRVCC handover is to be prepared for the UE, information about a target ID of the legacy network and a target transparent RAN container comprising information required for a target radio access network node in the legacy radio access to accept the handover. The target ID indicates where the handover should be routed to and within the legacy core network and radio access network. The NF service consumer determines, based on the obtained information, that no bearer splitting is to be performed since the handover is performed towards a CS domain in the legacy radio access and core network. The NF service consumer transmits an SRVCC handover required message to an NF service provider, which message comprises an indication that a SRVCC handover is to be prepared for the UE, the obtained transparent RAN container, the obtained information about a target ID of the legacy network and security information for the voice session derived by the NF service consumer.

According to a third aspect of embodiments herein, the object is achieved by an NF service provider in a 5G core network, for performing a method for managing SRVCC handover for a UE. The UE has a voice session anchored in an IMS in a PS domain in the 5G core network and in a 5G radio access network. The SRVCC handover moves the voice session to a CS domain in a legacy core network and radio access network. The NF service provider is configured to receive an SRVCC handover required message from an NF service consumer. The handover required message comprises an indication that an SRVCC handover is to be performed, information about a target ID of the legacy network, and a target transparent RAN container comprising information required for a target radio access network node in the legacy radio access to accept the handover. The target ID indicates where the handover should be routed to and within the legacy core network and radio access network. The NF service provider is further configured to obtain, based on the information received in the handover required message, a legacy target transparent RAN container comprising the information required for a target radio access network node in the legacy radio access to accept the handover, an identifier related to the voice session, a session transfer number for SRVCC (STN-SR) and legacy CS domain security information. The NF service provider is further configured to initiate the handover by transmitting the obtained information to the legacy core network over an Sv-interface.

According to a fourth aspect of embodiments herein, the object is achieved by an NF service consumer, for performing a method for managing SRVCC handover for a UE. The UE has a voice session anchored in an IMS in a PS domain in a 5G core and radio access network. The SRVCC handover moves the voice session to a CS domain in a legacy core network and radio access. The NF service consumer is configured to obtain, from a node in the 5G radio access network, a handover required message. The handover required message comprises an indication that SRVCC handover is to be prepared for the UE, information about a target ID of the legacy network and a target transparent RAN container comprising information required for a target radio access network node in the legacy radio access to accept the handover. The target ID indicates where the handover request should be routed to and within the legacy core network and radio access. The NF service consumer is further configured to determine, based on the obtained information, that no bearer splitting is to be performed since the handover is performed towards a CS domain in the legacy radio access and core network. The NF service consumer is further configured to transmit a SRVCC handover required message to an NF service provider. The SRVCC handover required message comprises an indication that a SRVCC handover is to be prepared for the UE, the obtained transparent RAN container, the obtained information about a target ID of the legacy network and security information for the voice session derived by the NF service consumer.

It is furthermore provided herein a computer program comprising instructions, which, when executed on at least one processor, cause the at least one processor to carry out any of the methods above, as performed by the NF service provider. It is additionally provided herein a computer-readable storage medium, having stored thereon a computer program comprising instructions which, when executed on at least one processor, cause the at least one processor to carry out the method according to any of the methods above, as performed by the NF service provider.

It is furthermore provided herein a computer program comprising instructions, which, when executed on at least one processor, cause the at least one processor to carry out any of the methods above, as performed by the NF service consumer. It is additionally provided herein a computer-readable storage medium, having stored thereon a computer program comprising instructions which, when executed on at least one processor, cause the at least one processor to carry out the method according to any of the methods above, as performed by the NF service consumer.

The embodiments herein enable the UE to perform SRVCC handover from the 5G network without the having to use a bearer splitting function in the communications network, which creates less impact on the 5GC.

There is no need for bearer splitting function as is the case for SRVCC from the EPS to 2G/3G, hence less functionality is placed on an Access and Mobility Function (AMF) and no impact on a Session Management Function (SMF). The Access Transfer Control Function (ATCF) located in the IMS is responsible to release the source access leg over 5GS.

Hence, the reliability of the SRVCC handover is improved, which reduces the risk of the voice call being dropped.

By providing a dedicated SRVCC Function that removes the requirement to implement Sv and other legacy functionality, such as e.g. mapping to a CS security key, in the AMF, possibly by reusing a Mobility Management Entity (MME) implementation of SRVCC related functionality, the load on the AMF is reduced which increases the performance and reliability of the communication network.

BRIEF DESCRIPTION OF THE DRAWINGS

Embodiments will now be described in more detail in relation to the enclosed drawings, in which.

DETAILED DESCRIPTION

The embodiments described herein provide support for SRVCC handover (HO) from 5G, i.e. from the 5G core network (5GC) and the 5G radio access network (NG-RAN), towards legacy radio accesses, such as e.g. 2G/3G, Code Division Multiple Access (CDMA), GSM EDGE Radio Access Network (GERAN) and/or UMTS Terrestrial Radio Access Network (UTRAN) radio accesses, having a circuit switched (CS) domain.

When performing SRVCC from EPS to 2G/3G, GBR bearers have to be split from the remaining bearers, because the GBR bearers cannot be handed over or resumed on 2G/3G PS. The GBR bearers are released as part of this procedure. However, if not indicated to a Packet Gateway (PGW) and to PCC as a special SRVCC case, the release of the GBR bearers may lead the voice call being cleared by an IMS, since the release of the GBR bearers may be seen as a loss of bearer, which may imply loss of radio connectivity.

In order to stop the voice call from being charged although the voice call has been lost, the IMS is configured to clear the voice session. The split of GBR bearers implies that the GBR bearer for voice must be re-established if the SRVCC cannot be completed, e.g. if the UE, after receiving the handover command, cannot camp on the target radio access and returns to EPS.

The embodiments herein however, provide a solution for performing SRVCC for 5GC without having to perform bearer splitting as in EPS. The embodiments herein provide a dedicated SRVCC function in the 5GC for performing an SRVCC handover, which interacts with a legacy core network via a Sv interface.

Figure 1:
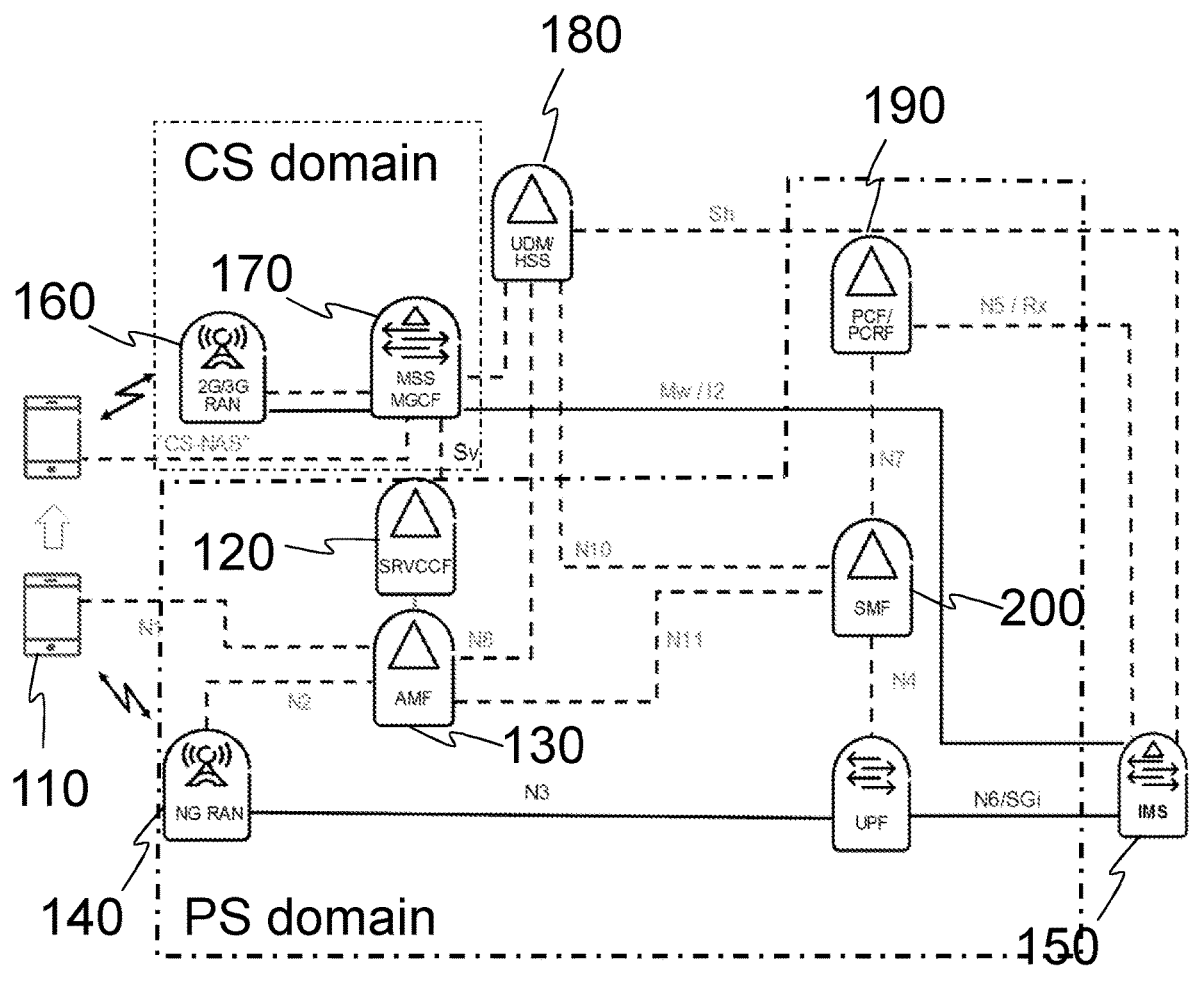
FIG. 1 is a schematic overview depicting a communication network according to prior art.

Embodiments herein relate to a communication network in general. FIG. 1 is a schematic overview depicting a communication network 100. The communication network 100 comprises a Radio Access Network (RAN) and a Core Network (CN). The communication network 100 may use a number of different technologies, such as W-Fi, Long Term Evolution (LTE), LTE-Advanced, 5G, 2G/3G, CDMA, UTRAN, GERAN, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in both a 5G, 4G, 3G and 2G context. Earlier technologies using CS domains are herein also referred to as legacy communication networks, legacy core networks or legacy RAN depending on the specific part of the network that it refers to.

In the communication network 100, wireless devices e.g. a User Equipment (UE) 110 such as a mobile station, a non-access point (non-AP) STA, a STA, a wireless device and/or a wireless terminal, communicate via an Access Network (AN), e.g. a RAN, with the CN. It should be understood by those skilled in the art that an UE is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 100 comprises a set of radio network nodes, such as radio network nodes 140, 160 each providing radio coverage over one or more geographical areas of a radio access technology (RAT), such as 5G New Radio (NR), LTE, UMTS, GSM, Wi-Fi or similar. The radio network node 140, 160 may be a radio access network node such as a radio network controller or an access point such as a wireless local area network (WLAN) access point or an Access Point Station (AP STA), an access controller, a base station, e.g. a radio base station such as a NodeB, an evolved Node B (eNB, eNodeB), a 5G nodeB (gNB), a base transceiver station, Access Point Base Station, base station router, a transmission arrangement of a radio base station, a standalone access point or any other network unit capable of serving a wireless device within the cell, which may also be referred to as a service area, served by the radio network node 140, 160 depending e.g. on the first radio access technology and terminology used. The radio network nodes 140, 160 are comprised in the radio access network (RAN).

The radio network node 140 is a gNB operating in a packet switched (PS) domain of the communications network 100 and the radio network node 160 is a legacy RAN node operating in a circuit switched (CS) domain of the communications network 100.

The overall architecture for the embodiments described herein is shown in FIG. 1. The UE 110 is initially connected to a 5G Core network (5GC) via an NG-RAN 140 (5G RAN) and has an active IP-Multimedia Subsystem (IMS) call, which may also be referred to as a voice session, or connection being anchored in the IMS 150. There may be a need to move the UE 110 away from 5G to 2G/3G network coverage. This may e.g. be due to the UE 110 leaving 5G coverage. It may however also be due to the fact that the RAN decides to perform a handover due to 2G/3G coverage being better for a voice service, and the operator having either not 4G deployed at all, having 4G deployed but not having deployed IMS 150 in the 4G network or at least not in the current area of the UE 110. One possibility to support IMS call continuity in this scenario, is to move the UE 110 from 5G to 2G/3G using a SRVCC handover procedure. There is however no SRVCC specified between 5G and 2G/3G networks in 3GPP Rel 15. The current embodiments therefore introduce support for SRVCC handover from 5G, such as from the 5GC and the NG-RAN 140, towards legacy radio accesses having a CS domain, such as 2G/3G radio accesses 160. This may be achieved by introducing a network function (NF) service provider 120, such as e.g. a new improved SRVCC Function (SRVCCF), between an NF service consumer 130, such as e.g. the AMF, in 5GC and a Mobile Switching Server (MSS) 170 in the 2G/3G CS CN, which is herein also referred to as a legacy core network. The NF service provider 120, such as e.g. the SRVCCF, supports an Sv-interface towards the MSS 170 and a new interface towards the NF service consumer 130, such as the AMF, which may be realized using service based architecture. NF service consumer shall herein be interpreted as an entity or a function requesting a service from another function and NF service provider shall herein be interpreted as an entity or a function providing a service to another entity or function within the communications network 100. The SRVCC handover may be triggered from the NG-RAN 140 and different embodiments are described herein for where a legacy target transparent RAN container for the legacy RAN, such as the 2G/3G RAN, may be constructed, how a CS security context for the UE 110 may be derived and how other information needed over the Sv-interface may be provided to the NF service provider 120, such as the SRVCCF. Thereby, the overall SRVCC handover is simplified since there is no need to perform any bearer splitting on the 5GC side of the communications network.

The SRVCC from the NG-RAN enables service continuity for voice and emergency calls from NG-RAN to 2G/3G. The existing SRVCC capabilities comprise:

Support of all voice call states, such as e.g. alerting, pre-alerting, held, and conference calls.

Video media of an HD Video call being dropped during SRVCC. Hence, there is no support of video SRVCC.

No Inter RAT (I RAT) PS handover to 2G/3G required. Rich Communication Suite (RCS) and other non-real-time services may resume on 2G/3G PS access, depending on access capabilities and operator preferences, after reestablishing network connectivity.

Short Message Service (SMS) over Non-Access Stratum (NAS) or SMS over IP is used for SMS. Hence there is no need for combined attach on NG-RAN.

No need for Circuit Switched Fallback (CSFB) for Unstructured Supplementary Service Data (USSD), as is the case in LTE, when using USSI (USSD over IMS), or when using no USSD at all The improved SRVCC Function according to the embodiments disclosed herein provides the following functionality:

Interaction with MSS via the Sv-Interface

May build or map transparent container to the legacy CS domain, if required and not provided by NG-RAN.

May perform security context mapping, if not performed by the Access and Mobility Function (AMF).

Obtain a SRVCC Session Transfer Number (STN-SR) and an identifier for identifying the voice session, such as a Correlation Mobile Station ISDN (C-MSISDN) number, from the AMF. The AMF may obtain both from a User Data Management/Home Subscriber Service (UDM/HSS) 180 and may use them as input for the decision whether SRVCC is possible for the specific subscriber and/or UE 110.

The AMF does not need to split the Guaranteed Bit Rate (GBR) Quality of Service (QoS) flows from the non-GBR flows.

An Access Transfer Control Function (ATCF) which is located in the IMS, may when receiving the session transfer request from the MSC, release the source access leg via 5GS, i.e. 5GC and NG-RAN, and thereby all bearers on the PDU session to the IMS Access Point Name (APN) may be released. In 5G the APN may also be referred to as a Data Network Name (DNN).

Figure 2:
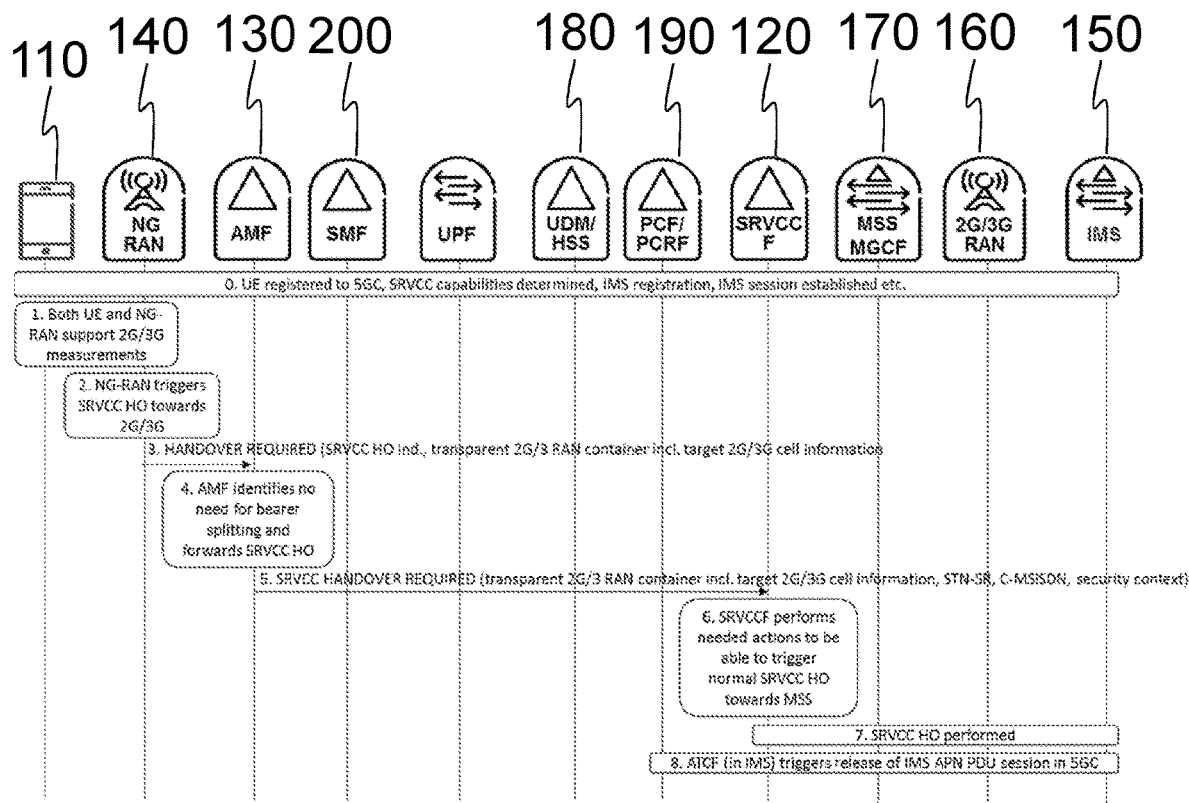
FIG. 2 is a signaling diagram depicting SRVCC handover according to embodiments herein.

FIG. 2 shows an exemplary signaling flow for the embodiments disclosed herein. FIG. 2 is a high-level description of the signalling flow, the textual description contains description of multiple different embodiments, relating to e.g. where the legacy target transparent RAN container, such as e.g. a 2G/3G RAN target transparent container, is constructed and how the CS security context for the UE 110 is derived. The container is transparent in the sense that the participating communication devices, such as the NF service consumer 130 and/or the NF service provider 120 through which the container passes may need to be aware of part of the information comprised in the container but usually do not change the information in the container.

The following steps take place in FIG. 2. The prerequisites are that the UE 110 is registered to 5GC, SRVCC capabilities have been determined, which comprises the AMF informing the NG-RAN that SRVCC is possible, and that the UE 110 has an IMS call and/or connection in an active, alerting or pre-alerting state. Or in other words, the UE is in an active and/or connected state in the NG-RAN. This is shown as step 0 in FIG. 2. The rest of the steps are as follows:

1) A radio access node, such as a gNB or an eNB, in the NG-RAN 140 has 2G/3G cells in a neighbour cell list and provides this list to the UE 110 when
both the UE 110 and the NG-RAN 140 support 2G/3G measurements and
the NF service consumer 130, such as the AMF, has informed the NG-RAN 140 that SRVCC is possible, taking into account that a STN-SR and a C-MSISDN have been received from the UDM/HSS 180, in accordance with step 0.

2) The NG-RAN 140 identifies a need for performing handover of the UE 110 towards a legacy RAN 160, such as e.g. a 2G/3G RAN, and triggers SRVCC handover towards the legacy RAN 160. In a basic embodiment, the NG-RAN 140 builds a transparent RAN container with information required in the target legacy RAN 160 side. The transparent RAN container may also be referred to as a "Source to Target Transparent Container".

3) The NG-RAN 140 sends a HANDOVER REQUIRED message to the NF service consumer 130, such as the AMF. The message may comprise an SRVCC indication, a transparent RAN container comprising legacy cell information, and/or a Target ID indicating where the handover should be routed by the NF service consumer 130, such as the AMF, and by the NF service provider 120, such as the SRVCCF. In the basic embodiment the Target ID may either be a Radio Network Controller Identifier (RNC-ID) for 3G target cell comprising LAI and RNC-ID, and/or a Cell Global Identity (CGI) for a 2G target cell comprising LAI and Cell identity. Additional information required for the SRVCC handover may also be comprised, such as e.g. MS Classmark 2/3 information.

4) The NF service consumer 130, such as the AMF, identifies the need to perform, which may herein also be referred to as prepare, SRVCC handover towards the legacy network, such as the 2G/3G network. Since only the CS service is moved to the legacy network there is no need to perform bearer splitting as in EPS, hence there is no need to initiate PS handover from 5G to the legacy network. The NF service consumer 130 may select an NF service provider 120 based on the received Target ID or based on a local configuration. The NF service consumer 130 forwards the SRVCC handover request to the NF service provider 120 and may further provide:
   a. C-MSISDN and STN-SR, as received from the UDM/HSS 180.
   b. A CS security key derived from 5GS domain security keys.
   c. A legacy transparent RAN container, such as a 2G/3G transparent RAN container as received from NG-RAN 140.
   d. A Target ID as received from NG-RAN 140.

5) The NF service consumer 130, such as the AMF, may then send a SRVCC HANDOVER REQUIRED message to the NF service provider 120, such as the SRVCCF, with the content described in step 4.

6) The NF service provider 120 may perform required actions to be able to trigger SRVCC handover of the UE 110 towards the MSS 170. In the basic embodiment the NF service provider 120 may receive the C-MSISDN, the STN-SR, the CS security key, the transparent RAN container and the Target ID from the NF service consumer 130, and may use these towards the MSS 170. The NF service provider 120 may also select a specific MSS 170, e.g. based on the received Target ID or local configuration.

7) The NF service provider 120 may initiate SRVCC related procedures towards the MSS 170 (same as in 23.216), which may also be referred to as preparing SRVCC handover for the UE. The basic procedure may correspond to the existing SRVCC over the Sv-interface. In addition, the SRVCCF may provide a 5G identifier for Key Performance Indicator (KPI) purposes, such as e.g. to trace whether SRVCC from 5GS was successful or not compared to SRVCC from the EPS. Normal SRVCC handover may be performed with the possible exception that a 5G identifier was provided for KPI purposes.

8) The ATCF comprised in the IMS 150 may, after receiving the session transfer request including the STN-SR and switching media, delete the source access leg and thereby the media bearers of the UE session in 5GS. The ATCF may also use optional SRVCC indication to indicate to a Policy Control Function (PCF) 190 that the release was due to a successful SRVCC in order to prevent the PCRF from clearing the call due to loss of the voice bearer.

The above steps describe the basic embodiment, additional embodiments will be described in the following:

2.1 Handling of the Legacy Target Transparent RAN Container

In a first embodiment such as in the basic scenario disclosed in FIG. 2, the legacy target transparent RAN container, such as a 2G/3G target transparent RAN container, may be constructed in the NG-RAN 140, such as e.g. by a gNB or an eNB, and may then be forwarded to the NF service provider 120, such as the SRVCCF, by the NF service consumer 130, such as the AMF. In this case the NF service provider 120 may forward the received transparent RAN container towards the MSS 170 in a target legacy RAN, such as e.g. the 2G/3G RAN.

In another embodiment the NG-RAN, such as e.g. the gNB or the eNB, may build a 5G target transparent RAN container that is then forwarded to the NF service provider 120 by the NF service consumer 130. In this case the NF service provider 120 performs the conversion needed from the 5G RAN transparent container to the legacy target transparent RAN container and then uses the legacy target transparent RAN container towards the MSS 170.

In still another embodiment the NG-RAN, such as e.g. the gNB or the eNB, may build a 4G target transparent RAN container that is then forwarded to the NF service provider 120 by the NF service consumer 130. In this case the NF service provider 120 performs the conversion needed from 4G transparent RAN container to legacy transparent RAN container and then uses the legacy transparent RAN container towards the MSS 170.

Examples of the legacy RAN target transparent containers may e.g. be a "Source RNC to Target RNC Transparent Container" IE as defined in 3GPP Rel-14 TS 25.413 v14.1.0 or "Old BSS to New BSS information elements" field of the Old BSS to New BSS information IE as defined in 3GPP Rel-14 TS 48.008 v14.2.0.

2.2 Handling of CS Security Information

In the first embodiment, such as in the basic scenario disclosed in FIG. 2, the CS security information is derived in the NF service consumer 130 based on 5GS security information and forwarded to the NF service provider 120 by the NF service consumer 130. In this case the NF service provider 120 can just forward the received CS security information towards MSS 170 and target 2G/3G RAN.

In another embodiment the NF service consumer 130 sends the 5GS security information to the NF service provider 120. In this case the NF service provider 120 derives the CS security information based on the received 5GS security information and then uses the derived CS security information towards MSS 170.

In still another embodiment the NF service consumer 130 derives 4G security information based on 5GS security information and forwards the 4G security information to the NF service provider 120. In this case the NF service provider 120 derives the CS security information based on the received 4G security information and then uses the derived CS security information towards MSS.

2.3 C-MSISDN and STN-SR Handling

In the first embodiment, such as in the basic scenario disclosed in FIG. 2, the NF service consumer 130 receives the C-MSISDN and STN-SR from the UDM/HSS and forwards these to the NF service provider 120. The NF service consumer 130 can also use this information to indicate to NG-RAN that SRVCC is possible for a specific UE. This is likely the preferred option but it would also be possible that the NF service provider 120 requests the C-MSISDN and STN-SR information from UDM/HSS when the SRVCC HANDOVER required message is received (steps 5 and 6).

2.4 NF Service Provider, Such as SRVCCF, Selection by the NF Service Consumer, Such as the AMF, and MSS Selection by the NF Service Provider In a first embodiment, such as in the basic scenario disclosed in FIG. 2, the specific NF service provider 120 is selected by the NF service consumer 130 based on either a legacy Target ID, such as e.g. a 2G/3G Target ID, or a local configuration. The need for additional logic may for example be dependent on how many NF service providers 120 that are deployed in the network and if specific NF service providers 120 are only serving a specific area and are therefore able to only connect to specific MSS(s). The basic case may also mean that the NF service consumer 130, such as the AMF, would need to be configured with legacy information, such as 2G/3G information.

In another embodiment the NF service consumer 130 may instead use 4G or 5G Tracking Area Identity (TAI) information to select a specific NF service provider 120. In this case, the NG-RAN may use the 4G/5G TAI information as the Target ID, while still indicating the real target legacy cell information, such as 2G/3G cell information, in e.g. the target transparent RAN container. The NG-RAN may select the 4G/5G TAI based on 4G/5G measurements received from the UE 110 or other local configuration. The NF service consumer 130 may then select an NF service provider 120 based on the received 4G/5G TAI. The NF service provider 120, such as the SRVCCF, may also need to be able to select a specific MSS. In this embodiment, this selection may be performed based on the real target legacy cell information, such as 2G/3G cell information, in e.g. the target transparent RAN container.

2.5 Handling of Non-IMS PDU Sessions and Bearers

The basic scenario shown in FIG. 2 further discloses that the ATCF may initiate a deletion of all IMS session related resources in 5GS after the SRVCC handover has been performed. The non-IMS PDU session related resources may be handled in different ways.

In one embodiment, either the NF service consumer 130 or the NG-RAN 140 may release other non-IMS PDU session related resources after a successful SRVCC handover. This variant may also be an option for the IMS PDU sessions, instead of being triggered by the ATCF in the IMS 150.

In another embodiment, either the PCF 190 or the SMF 200 can trigger the release of non-IMS PDU session related resources after successful SRVCC handover. This may require that the ATCF informs the PCF 190 that the deletion of resources is due to a successful SRVCC handover. The PCF 190 may then use this as an indication to release all PDU sessions for the UE 110 in the different SMFs 200. The PCF 190 may also forward the indication about the successful SRVCC Handover to all SMFs 200 serving the UE 110 and then these SMFs may perform the deletion. The IMS Access Point Name (APN), or DNN, Protocol Data Unit (PDU) session may be controlled by the NF service consumer 130, such as the AMF. Hence the NF service consumer 130 may detect that other PDU sessions not related to the voice session, such as e.g. non-IMS PDU sessions, can be released, e.g. once the SRVCC handover is successful. In some embodiments the NF service consumer 130, such as the AMF, may thus trigger the release of the non-IMS PDU session in the 5GC.

Figure 3:
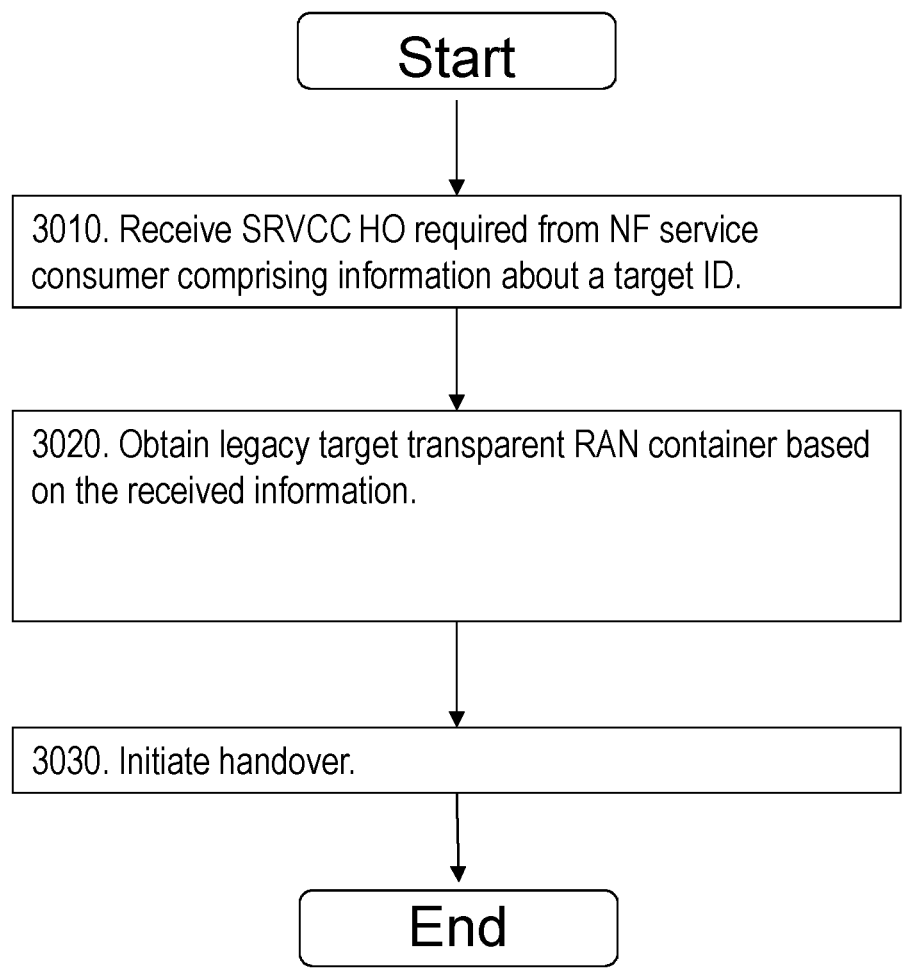
FIG. 3 is a flowchart depicting a method performed by an NF service provider according to embodiments herein.

The method actions performed by the NF service provider 120 for managing SRVCC handover for a UE 110 according to embodiments herein will now be described with reference to a flowchart depicted in FIG. 3. The NF service provider 120 is comprised in a 5G core network and the UE 110 has a voice session anchored in an IMS 150 in a PS domain in the 5G core network and in the 5G radio access network. The SRVCC handover moves the voice session to the CS domain in the legacy core network and radio access network. The NF Service provider 120 may be an SRVCCF located in the 5GC. The actions do not have to be taken in the order stated below, but may be taken in any suitable order. Actions performed in some embodiments only are marked with dashed boxes.

Action 3010: The NF service provider 120 receives an SRVCC handover required message from an NF service consumer 130. The message comprises an indication that a SRVCC handover is to be performed and information about a target ID of the legacy network. The target ID indicates where the handover should be routed to and within the legacy core network 170 and radio access network 160. To and within shall herein be interpreted as both indicating the legacy core node to which the request for the handover is transmitted and the legacy RAN node and/or cell to which the voice session is handed over within the legacy network. The message further comprises a target transparent RAN container comprising information required for a target radio access network node in the legacy radio access network 160 to accept the handover.

The target ID of the legacy network may be received from the NF service consumer 130 in the target transparent RAN container or as an information element in the handover required message.

This action 3010 is similar to the action 5 described in relation to FIG. 2.

Action 3020: The NF service provider 120 obtains, based on the information received in the SRVCC handover required message, a legacy target transparent RAN container comprising information required for the target radio access network node in the legacy radio access network 160 to accept the handover, an identifier related to the voice session, such as e.g. a C-MSISDN, a session transfer number for SRVCC (STN-SR) and a legacy CS domain security information.

In some embodiments the legacy target transparent RAN container may be obtained by the NF service provider 120 by receiving the legacy target transparent RAN container from the NF service consumer 130. The legacy transparent RAN container may in this case have been generated by a radio access network node in the 5G radio access network 140. In some further embodiments the legacy target transparent RAN container may be obtained by the NF service provider 120 by receiving a 4G or 5G target transparent RAN container from the NF service consumer 130 and converting the 4G or 5G target transparent RAN container to the legacy target transparent RAN container. The obtaining of the legacy transparent RAN container is further described in section 2.1 above.

The legacy CS domain security information may be obtained by the NF service provider 120 by receiving the legacy CS domain security information from the NF service consumer 130. The legacy CS domain security information may in this case have been derived by the NF service consumer 130 based on PS domain security information related to the voice session of the UE 110. In some embodiments the legacy CS domain security information may be obtained by the NF service provider 120 by receiving PS domain security information related to the voice session from the NF service consumer 130. The legacy CS domain security information may then be derived by the NF service provider 120 based on the PS domain security information received from the NF service consumer 130. The obtaining of the legacy CS domain security information is further described in section 2.2 above.

The NF service provider 120 may obtain the identifier related to the voice session and the STN-SR, by receiving the identifier related to the voice session and/or the STN-SR from the NF service consumer 130. In some embodiments the NF service provider 120 may obtain the identifier related to the voice session and STN-SR by receiving a permanent subscription identifier for the UE from the NF service consumer 130. The NF service provider 120 sends a request for the identifier related to the voice session and/or the STN-SR to a subscriber data management, which request comprises the permanent subscription identifier. The NF service provider 120 then receives the requested identifier related to the voice session and the STN-SR from the subscriber data management. The obtaining of the identifier related to the voice session and the STN-SR is further described in section 2.3 above.

This action 3020 is similar to the action 6 described in relation to FIG. 2.

Action 3030: The NF service provider 120 initiates the SRVCC handover by transmitting the obtained information to the legacy core network over an Sv-interface. Initiating the handover may further comprise selecting a specific legacy core network node 170, such as a specific MSS to transmit the information regarding the SRVCC handover to, in accordance with section 2.4 above. This action 3030 is similar to the action 7 described in relation to FIG. 2.

Figure 4:
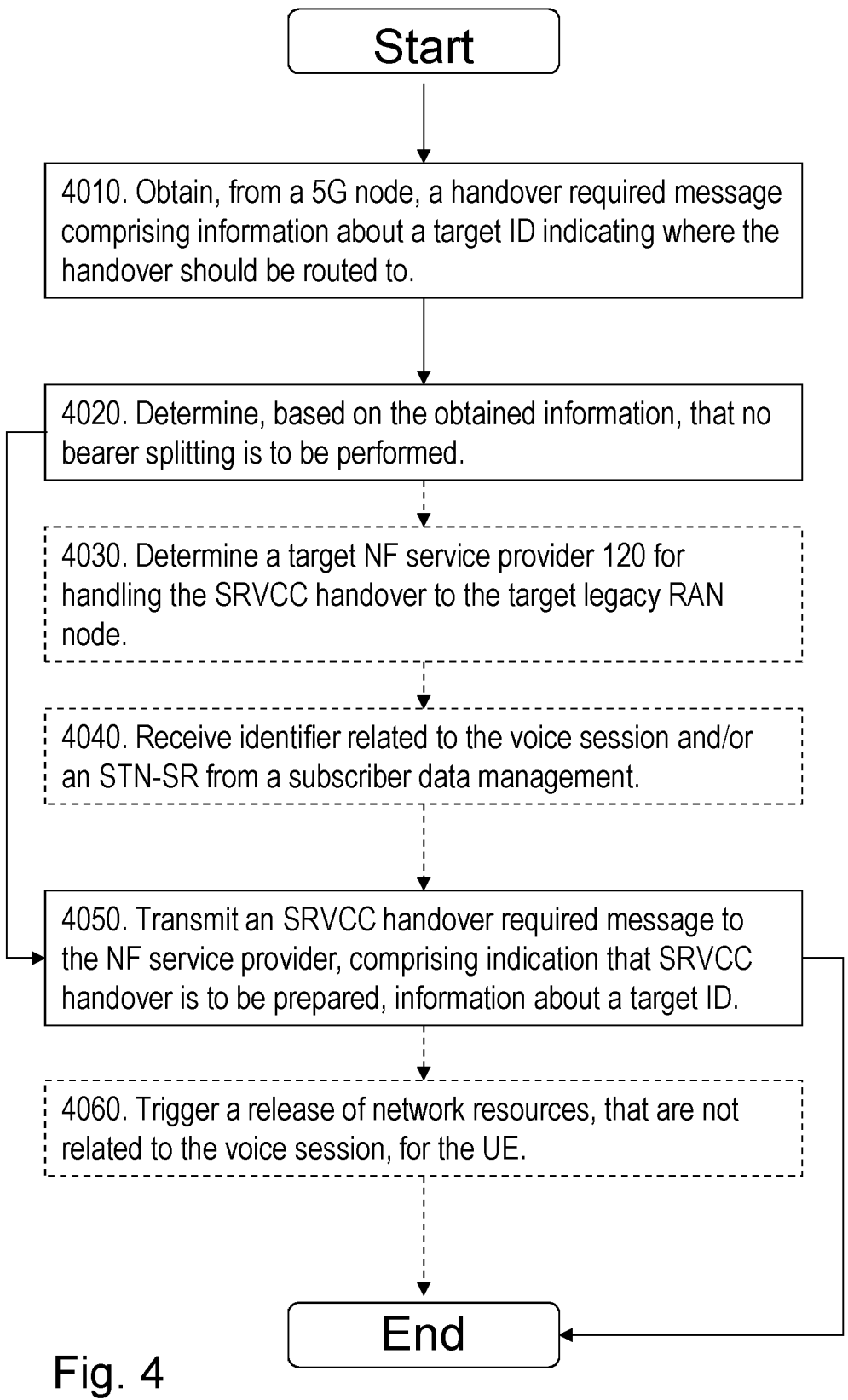
FIG. 4 is a flowchart depicting a method performed by an NF service consumer according to embodiments herein.

The method actions performed by the NF service consumer 130 for managing SRVCC handover for a UE 110 according to embodiments herein will now be described with reference to a flowchart depicted in FIG. 4. The NF service consumer 130 is comprised in a 5G core network and the UE 110 has a voice session anchored in the IMS 150 in a PS domain in the 5G core network and in the 5G radio access network. The SRVCC handover moves the voice session to a CS domain in a legacy core network and radio access network 160. The NF Service consumer may be an Access and Mobility Management Function (AMF) located in the 5G Core network (5GC). The actions do not have to be taken in the order stated below, but may be taken in any suitable order. Actions performed in some embodiments only are marked with dashed boxes.

Action 4010: The NF service consumer 130 obtains, from a node in the 5G radio access network 140, a handover required message comprising an indication that SRVCC handover is to be prepared for the UE 110, information about a target ID of the legacy network, wherein the target ID indicates where the handover should be routed to and within the legacy core network and radio access network, and a target transparent RAN container comprising information required for a target radio access network node in the legacy radio access 160 to accept the handover. The obtained transparent RAN container may e.g. be a 4G or a 5G target transparent RAN container or a legacy target transparent RAN container. The obtaining of the transparent RAN container is further described in section 2.1 above. This action 4010 is similar to the action 3 described in relation to FIG. 2.

Action 4020: The NF service consumer 130 determines, based on the obtained information, that no bearer splitting is to be performed, since the handover is only performed towards a CS domain in the legacy radio access and core network. The NF service consumer 130 may identify, prior to transmitting an SRVCC handover required message to the NF service provider 120 and based on the information received in the handover required message from the 5G RAN (NG-RAN) 140, that only a transfer of voice service from the PS domain to the CS domain is required for the UE session and thus that no initiating of a PS handover has to be performed for non-IMS PDU session related resources of the UE session. This action 4020 is similar to action 4 described in relation to FIG. 2.

Action 4030: In some embodiments, when there are several NF service providers 120 available, the NF service consumer 130 may determine a target NF service provider 120 for handling the SRVCC handover to the target legacy RAN node in the legacy RAN 160. The determining of the target NF service provider is further described in section 2.4 above.

Action 4040: In some embodiments, the NF service consumer 130 may receive an identifier related to the voice session and/or a session transfer number (STN-SR) from a subscriber data management 180, such as e.g. the UDM/HSS. The receiving of the identifier related to the voice session and/or the STN-SR is further described in section 2.3 above.

Action 4050: The NF service consumer 130 transmits an SRVCC handover required message to an NF service provider 120. The message comprises an indication that an SRVCC handover is to be prepared for the UE 110. The message further comprises the obtained transparent RAN container, the obtained information about a target ID of the legacy network and security information for the voice session derived by the NF service consumer 130.

When the NF service consumer 130 has determined a target NF service provider 120, the NF service consumer 130 may transmit the SRVCC handover required message to the determined NF service provider 120.

The security information derived by the NF service consumer 130 may be a PS domain security information, which may also be referred to as 5G or 4G security information.

In some embodiments the derived security information may be a legacy CS security information for the voice session to be used by the target cell of the legacy radio access. The legacy CS security information may have been derived by the NF service consumer 130 based on PS domain security information.

In some embodiments, the transmitted handover required message may further comprise the identifier related to the voice session, such as e.g. the C-MSISDN, and the STN-SR received from the subscriber data management 180.

The target ID of the legacy network may be transmitted to the NF service provider 120 in the obtained transparent RAN container or as an information element in the handover required message.

This action is similar to the action 5 described in relation to FIG. 2.

Action 4060: In some embodiments, the NF service consumer 130 may trigger a release of network resources, which are not related to the voice session, for the UE 110. The triggering may be performed once an indication has been received that the SRVCC handover has been successfully performed. The receiving of the identifier related to the voice session and/or the STN-SR is further described in section 2.3 above.

Figure 5:
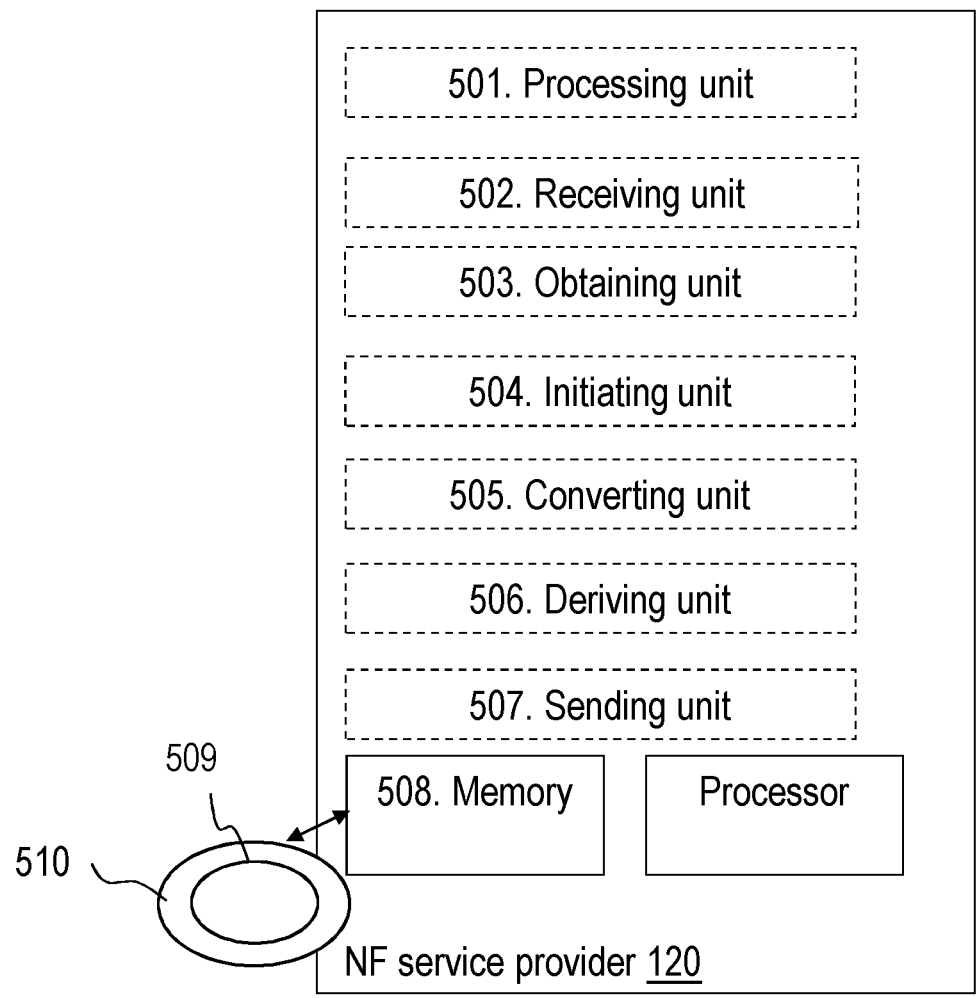
FIG. 5 is a block diagram depicting an NF service provider according to embodiments herein.

FIG. 5 is a block diagram depicting the NF service provider 120 in the 5GC, for managing SRVCC handover for a UE 110. The UE 110 has a voice session anchored in an IMS in a PS domain in the 5GC and in the NG-RAN. The SRVCC handover moves the voice session to a CS domain in a legacy core network and RAN. The NF Service provider may be a Single Radio Voice Call Continuity Function, SRVCCF, located in the 5G Core network, 5GC. The NF service provider 120 may comprise a processing unit 501, such as e.g. one or more processors, a receiving unit 502, an obtaining unit 503, an initiating unit 504, a converting unit 505, a deriving unit 506 and a sending unit 507 as exemplifying hardware units configured to perform the methods described herein.

The NF service provider 120, the receiving unit 502 and/or the processing unit 501 is configured to, receive an SRVCC handover required message from the NF service consumer 130. The handover required message comprises an indication that a SRVCC handover is to be performed for the UE 110 and information about a target ID of the legacy network. The target ID indicates where the handover should be routed to and within the legacy core network and radio access. The handover required message further comprises a target transparent RAN container comprising information required for the target radio access network node in the legacy radio access to accept the handover.

The NF service provider 120, the obtaining unit 503 and/or the processing unit 501 is further configured to obtain, based on the information received in the handover required message, a legacy target transparent RAN container comprising information required for the target radio access network node in the legacy radio access 140 to accept the handover, the identifier related to the voice session, the STN-SR and legacy CS domain security information.

The NF service provider 120, the initiating unit 504 and/or the processing unit 501 is further configured to initiate the handover by transmitting the obtained information to the legacy core network over an Sv-interface.

The NF service provider 120, the receiving unit 502 and/or the processing unit 501 may further be configured to, receive the legacy target transparent RAN container from the NF service consumer 130, which container has been generated by a radio access network node in the 5G RAN 140, in order to obtain the legacy target transparent RAN container.

In order to obtain the legacy target transparent RAN container, the NF service provider 120, the receiving unit 502 and/or the processing unit 501 may further be configured to receive a 4G or 5G target transparent RAN container from the NF service consumer 130. The NF service provider 120, the converting unit 502 and/or the processing unit 501 may further be configured to convert the 4G or 5G target transparent RAN container to the legacy target transparent RAN container.

The NF service provider 120, the receiving unit 502 and/or the processing unit 501 may further be configured to, in order to obtain the legacy CS domain security information, receive the legacy CS domain security information from the NF service consumer 130, which legacy CS domain security information has been derived by the NF service consumer 130 based on PS domain security information related to the voice session.

In order to obtain the legacy CS domain security information, the NF service provider 120, the receiving unit 502 and/or the processing unit 501 may further be configured to receive PS domain security information related to the voice session from the NF service consumer 130. The NF service provider 120, the deriving unit 502 and/or the processing unit 501 may further be configured to derive the legacy CS domain security information based on the PS domain security information received from the NF service consumer 130.

The NF service provider 120, the receiving unit 502 and/or the processing unit 501 may further be configured to receive the identifier related to the voice session and/or the STN-SR from the NF service consumer 130, in order to obtain the identifier related to the voice session and the STN-SR.

In order to obtain the identifier related to the voice session and the STN-SR, the NF service provider 120, the receiving unit 502 and/or the processing unit 501 may further be configured to receive a permanent subscription identifier for the UE 110 from the NF service consumer 130. The NF service provider 120, the sending unit 507 and/or the processing unit 501 may further be configured to send a request for the identifier related to the voice session and the STN-SR to a subscriber data management. The request may comprise the permanent subscription identifier. The NF service provider 120, the receiving unit 502 and/or the processing unit 501 may further be configured to receive the requested identifier related to the voice session and the STN-SR from the subscriber data management.

The NF service provider 120, the receiving unit 502 and/or the processing unit 501 may further be configured to receive the target ID of the legacy network in the target transparent RAN container or as an information element in the handover required message.

The embodiments herein may be implemented through a respective processor or one or more processors, such as the processor 501 of a processing circuitry in the NF service provider 120 depicted in FIG. 5, together with respective computer program code for performing the functions and actions of the embodiments herein. The program code mentioned above may also be provided as a computer program product, for instance in the form of a data carrier carrying computer program code for performing the embodiments herein when being loaded into the NF service provider 120. One such carrier may be in the form of a CD ROM disc. It is however feasible with other data carriers such as a memory stick. The computer program code may furthermore be provided as pure program code on a server and downloaded to the NF service provider 120.

The NF service provider 120 may further comprise a memory 508. The memory 508 comprises one or more memory units to be used to store data on, such as system information, configurations and/or applications to perform the methods disclosed herein when being executed, and similar.

The methods according to the embodiments described herein for the NF service provider are respectively implemented by means of e.g. a computer program 509 or a computer program product, comprising instructions, i.e., software code portions, which, when executed on at least one processor, cause the at least one processor to carry out the actions described herein, as performed by the NF service provider. The computer program 509 may be stored on a computer-readable storage medium 510, e.g. a disc or similar. The computer-readable storage medium 510, having stored thereon the computer program, may comprise instructions which, when executed on at least one processor, cause the at least one processor to carry out the actions described herein, as performed by the NF service provider. In some embodiments, the computer-readable storage medium may be a non-transitory computer-readable storage medium.

Figure 6:
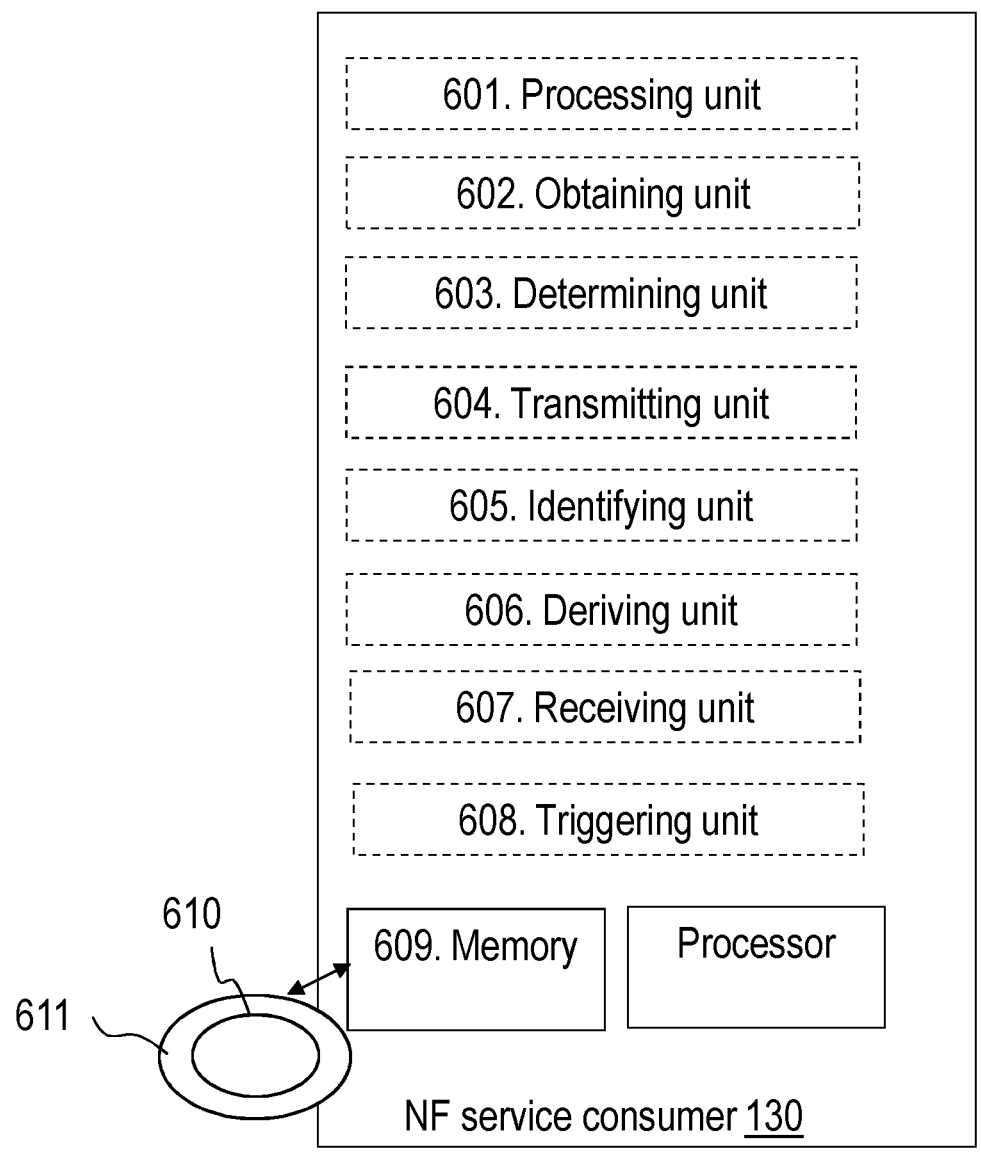
FIG. 6 is a block diagram depicting an NF service consumer according to embodiments herein.

FIG. 6 is a block diagram depicting the NF service consumer 120 in the 5GC, for managing SRVCC handover for a UE 110. The UE 110 has a voice session anchored in an IMS in a PS domain in the 5GC and in the NG-RAN. The SRVCC handover moves the voice session to a CS domain in a legacy core network and RAN. The NF Service consumer 130 may be an Access and Mobility Management Function, AMF, located in the 5GC. The NF service consumer 130 may comprise a processing unit 601, such as e.g. one or more processors, an obtaining unit 602, a determining unit 603, a transmitting unit 604, an identifying unit 605, a deriving unit 606, a receiving unit 607 and a triggering unit 608 as exemplifying hardware units configured to perform the methods described herein.

The NF service consumer 130, the obtaining unit 602 and/or the processing unit 601 is configured to obtain, from a node in the 5G radio access network 140, a handover required message comprising an indication that SRVCC handover is to be prepared for the UE 110. The handover required message further comprises information about a target ID of the legacy network, The information about the target ID indicates where the handover should be routed to and within the legacy core network and radio access network, The handover required message further comprises a target transparent RAN container comprising information required for the target radio access network node in the legacy radio access 160 to accept the handover.

The NF service consumer 130, the determining unit 603 and/or the processing unit 601 is further configured to determine, based on the obtained information, that no bearer splitting is to be performed, since the handover is performed towards a CS domain in the legacy radio access and core network.

The NF service consumer 130, the transmitting unit 604 and/or the processing unit 601 is further configured to transmit an SRVCC handover required message to the NF service provider 120. The SRVCC handover required message comprises an indication that a SRVCC handover is to be prepared for the UE 110, the obtained transparent RAN container, the obtained information about the target ID of the legacy network and security information for the voice session derived by the NF service consumer 130.

The NF service consumer 130, the identifying unit 605 and/or the processing unit 601 may further be configured to identify, prior to transmitting the handover required message to the NF service provider 120 and based on the information received in the handover required message, that only a transfer of a voice service of the UE 110 to the CS domain is required and that no initiating of a PS handover has to be performed.

The NF service consumer 130, the determining unit 603 and/or the processing unit 601 may further be configured to determine a target NF service provider 120 for handling the SRVCC handover, and the NF service consumer 130, the transmitting unit 604 and/or the processing unit 601 may further be configured to transmit the handover required message to the determined NF service provider 120.

The NF service consumer 130, the deriving unit 606 and/or the processing unit 601 may further be configured to derive the security information as a PS domain security information.

The NF service consumer 130, the deriving unit 606 and/or the processing unit 601 may further be configured to derive the security information as a legacy CS security information for the voice session to be used by the target cell of the legacy radio access and the NF service consumer 130, the deriving unit 606 and/or the processing unit 601 may further be configured to derive said legacy CS security information based on PS domain security information.

The NF service consumer 130, the obtaining unit 602 and/or the processing unit 601 may further be configured to obtain the transparent RAN container as a 4G or 5G target transparent RAN container or a legacy target transparent RAN container.

The NF service consumer 130, the transmitting unit 604 and/or the processing unit 601 may further be configured to transmit the SRVCC handover required message comprising an identifier related to the voice session and an STN-SR and the NF service consumer 130, the receiving unit 607 and/or the processing unit 601 may further be configured to receive the identifier related to the voice session and/or the STN-SR from a subscriber data management.

The NF service consumer 130, the triggering unit 608 and/or the processing unit 601 may further be configured to trigger a release of network resources, which are not related to the voice session, for the UE 110. The once an indication has been received that the SRVCC handover has been successfully performed.

The embodiments herein may be implemented through a respective processor or one or more processors, such as the processor 601 of a processing circuitry in the NF service consumer 130 depicted in FIG. 6, together with respective computer program code for performing the functions and actions of the embodiments herein. The program code mentioned above may also be provided as a computer program product, for instance in the form of a data carrier carrying computer program code for performing the embodiments herein when being loaded into the NF service consumer 130. One such carrier may be in the form of a CD ROM disc. It is however feasible with other data carriers such as a memory stick. The computer program code may furthermore be provided as pure program code on a server and downloaded to the NF service consumer 130.

The NF service consumer 130 may further comprise a memory 608. The memory 608 comprises one or more memory units to be used to store data on, such as system information, configurations and/or applications to perform the methods disclosed herein when being executed, and similar.

The methods according to the embodiments described herein for the NF service provider are respectively implemented by means of e.g. a computer program 609 or a computer program product, comprising instructions, i.e., software code portions, which, when executed on at least one processor, cause the at least one processor to carry out the actions described herein, as performed by the NF service consumer. The computer program 609 may be stored on a computer-readable storage medium 610, e.g. a disc or similar. The computer-readable storage medium 610, having stored thereon the computer program, may comprise instructions which, when executed on at least one processor, cause the at least one processor to carry out the actions described herein, as performed by the NF service consumer. In some embodiments, the computer-readable storage medium may be a non-transitory computer-readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a Network Function, NF, service provider in a 5G core network, for managing Single Radio Voice Call Continuity, SRVCC, handover for a User Equipment, UE, having a voice session anchored in an IP-Multimedia Subsystem, IMS, in a packet switched, PS, domain in the 5G core network and in a 5G radio access network, wherein the SRVCC handover moves the voice session to a circuit switched, CS, domain in a legacy core network and a radio access network, wherein the NF Service provider is a SRVCC Function, SRVCCF, located in the 5G Core network, the method comprising:
    receiving an SRVCC handover required message from an NF service consumer, wherein the NF service consumer is an Access and Mobility Management Function, AMF, located in the 5G Core network, wherein the SRVCC handover required message comprises:
        a) an indication that a SRVCC handover is to be performed
        b) information about a target ID of the legacy core network, wherein the target ID indicates where the handover should be routed to within the legacy core network and the radio access network,
        c) a target transparent Radio Access Network, RAN, container comprising information required for a target radio access network node in a legacy radio access network to accept the handover,
        d) security information for a voice session derived by the NF service consumer, and
        e) an identifier related to the voice session and a session transfer number for SRVCC, STN-SR,
    obtaining, based on the information received in the SRVCC handover required message, a legacy target transparent RAN container comprising (i) information required for the target radio access network node in the legacy radio access network to accept the handover, (ii) an identifier related to the voice session, (iii) the STN-SR, and (iv) legacy CS domain security information; and
    initiating the handover by transmitting the obtained information to the legacy core network over an Sv-interface.

2. The method according to claim 1, wherein the step of obtaining the legacy target transparent RAN container comprises:
    receiving the legacy target transparent RAN container from the NF service consumer, which container has been generated by a radio access network node in the 5G radio access network.

3. The method according to claim 1, wherein the step of obtaining the legacy target transparent RAN container comprises:
    receiving, from an NF service consumer, a 4G or 5G target transparent RAN container, and
    converting the 4G or 5G target transparent RAN container to the legacy target transparent RAN container.

4. The method according to claim 1, wherein the step of obtaining the legacy CS domain security information comprises:
    receiving the legacy CS domain security information from the NF service consumer, which legacy CS domain security information has been derived by the NF service consumer based on PS domain security information related to the voice session.

5. The method according to claim 1, wherein the step of obtaining the legacy CS domain security information comprises:
    receiving, from the NF service consumer, PS domain security information related to the voice session, and
    deriving the legacy CS domain security information based on the PS domain security information received from the NF service consumer.

6. The method according to claim 1, wherein the step of obtaining the identifier related to the voice session and the session transfer number, STN-SR, comprises:
    receiving a permanent subscription identifier for the UE from the NF service consumer,
    sending a request for the identifier related to the voice session and the session transfer number, STN-SR, to a subscriber data management, wherein the request comprises the permanent subscription identifier, and
    receiving the requested identifier related to the voice session and the STN-SR from the subscriber data management.

7. The method according to claim 1, wherein the target ID of the legacy core network is received from the NF service consumer in the target transparent RAN container or as an information element in the handover required message.

8. A method performed by a Network Function, NF, service consumer, in a 5G core network, for managing Single Radio Voice Call Continuity, SRVCC, handover for a User Equipment, UE, having a voice session anchored in an IP-Multimedia Subsystem, IMS, in a packet switched, PS, domain in the 5G core network and in a 5G radio access network, wherein the NF Service consumer is an Access and Mobility Management Function, AMF, located in the 5G Core network, wherein the SRVCC handover moves the voice session to a circuit switched, CS, domain in a legacy core network and a radio access network, wherein the method comprises:
    obtaining, from a node in the 5G radio access network, a handover required message comprising (a) an indication that SRVCC handover is to be prepared for the UE, (b) information about a target ID of the legacy core network, wherein the target ID indicates where the handover should be routed to and within the legacy core network and the radio access network, and (c) a target transparent Radio Access Network, RAN, container comprising information required for a target radio access network node in a legacy radio access network to accept the handover, determining, based on the obtained handover required message, that no bearer splitting is to be performed since the handover is performed towards a CS domain in the legacy radio access network and the legacy core network, and transmitting an SRVCC handover required message to an NF service provider, wherein the NF service provider is a SRVCC Function, SRVCCF, located in the 5G Core network, which message comprises:
- a) an indication that a SRVCC handover is to be prepared for the UE,
- b) the obtained target transparent RAN container,
- c) the obtained information about a target ID of the legacy core network,
- d) security information for the voice session derived by the NF service consumer, and
- e) an identifier related to the voice session and a session transfer number for SRVCC, STN-SR.

9. The method according to claim 8, wherein the step of determining further comprises:
   identifying, prior to transmitting the handover required message to the NF service provider and based on the information received in the handover required message, that only a transfer of voice service to the CS domain is required and that no initiating of a packet switched, PS, handover has to be performed.

10. The method according to claim 8, wherein the method further comprises:
   determining a target NF service provider for handling the SRVCC handover, and
   transmitting the handover required message to the determined NF service provider.

11. The method according to claim 8, wherein the derived security information is packet switched, PS, domain security information.

12. The method according to claim 8, wherein the derived security information is a legacy CS security information for the voice session to be used by a target cell of the legacy radio access network, wherein the legacy CS security information has been derived based on PS domain security information.

13. The method according to claim 8, wherein the obtained transparent RAN container is a 4G or 5G target transparent RAN container or a legacy target transparent RAN container.

14. The method according to claim 8, wherein the target ID of the legacy core network is transmitted to the NF service provider in the obtained transparent RAN container or as an information element in the handover required message.

15. The method according to claim 8, wherein the method further comprises:
   triggering a release of network resources, that are not related to the voice session, for the UE once an indication has been received that the SRVCC handover has been successfully performed.

16. A Network Function, NF, service provider in a 5G core network, for performing a method for managing Single Radio Voice Call Continuity, SRVCC, handover for a User Equipment, UE, having a voice session anchored in an IP-Multimedia Subsystem, IMS, in a packet switched, PS, domain in the 5G core network and in a 5G radio access network, wherein the NF Service provider is a SRVCC Function, SRVCCF, located in the 5G Core network, wherein the SRVCC handover moves the voice session to a circuit switched, CS, domain in a legacy core network and a radio access network, wherein the NF service provider is configured to:
   receive an SRVCC handover required message from an NF service consumer, wherein the NF Service consumer is an Access and Mobility Management Function, AMF, located in the 5G Core network, which message comprises:
   - a) an indication that a SRVCC handover is to be performed,
   - b) information about a target ID of the legacy core network, wherein the target ID indicates where the handover should be routed to and within the legacy core network and radio access,
   - c) a target transparent Radio Access Network, RAN, container comprising information required for a target radio access network node in a legacy radio access network to accept the handover,
   - d) security information for a voice session derived by the NF service consumer, and
   - e) an identifier related to the voice session and a session transfer number for SRVCC, STN-SR,
   obtain, based on the information received in the handover required message, a legacy target transparent RAN container comprising information required for a target radio access network node in the legacy radio access network to accept the handover, an identifier related to the voice session, the STN-SR, and legacy CS domain security information, and
   initiate the handover by transmitting the obtained information to the legacy core network over an Sv-interface.

17. The NF service provider according to claim 16, wherein the NF service provider, in order to obtain the legacy target transparent RAN container, is configured to:
   receive the legacy target transparent RAN container from the NF service consumer, which container has been generated by a radio access network node in the 5G radio access network.

18. The NF service provider according to claim 17, wherein the NF service provider, in order to obtain the legacy target transparent RAN container, is configured to:
   receive, from a NF service consumer, a 4G or 5G target transparent RAN container, and
   convert the 4G or 5G target transparent RAN container to the legacy target transparent RAN container.

19. The NF service provider according to claim 16, wherein the NF service provider, in order to obtain the legacy CS domain security information, is configured to:
   receive the legacy CS domain security information from the NF service consumer, which legacy CS domain security information has been derived by the NF service consumer based on PS domain security information related to the voice session.

20. The NF service provider according to claim 16, wherein the NF service provider, in order to obtain the legacy CS domain security information, is configured to:
   receive, from the NF service consumer, PS domain security information related to the voice session, and
   derive the legacy CS domain security information based on the PS domain security information received from the NF service consumer.

21. The NF service provider according to claim 16, wherein the NF service provider, in order to obtain the identifier related to the voice session and the STN-SR is configured to:

receive a permanent subscription identifier for the UE from the NF service consumer, send a request for the identifier related to the voice session and the session transfer number, STN-SR, to a subscriber data management, wherein the request comprises the permanent subscription identifier, and receive the requested identifier related to the voice session and the STN-SR from the subscriber data management.

22. The NF service provider according to claim 16, wherein the NF service provider is configured to receive the target ID of the legacy core network in the target transparent RAN container or as an information element in the handover required message.

23. A Network Function, NF, service consumer, for performing a method for managing Single Radio Voice Call Continuity, SRVCC, handover for a User Equipment, UE, having a voice session anchored in an IP-Multimedia Subsystem, IMS, in a packet switched, PS, domain in a 5G core and radio access network, wherein the NF Service consumer is an Access and Mobility Management Function, AMF, located in the 5G Core network, wherein the SRVCC handover moves the voice session to a circuit switched, CS, domain in a legacy core network and a radio access network, wherein the NF service consumer is configured to:

obtain, from a node in the 5G radio access network, a handover required message comprising:
a) an indication that SRVCC handover is to be prepared for the UE,
b) information about a target ID of the legacy core network, wherein the target ID indicates where the handover should be routed to and within the legacy core network and radio access network,
c) a target transparent Radio Access Network, RAN, container comprising information required for a target radio access network node in a legacy radio access network to accept the handover, and
d) an identifier related to the voice session and a session transfer number for SRVCC, STN-SR, determine, based on the obtained information, that no bearer splitting is to be performed since the handover is performed towards a CS domain in the legacy radio access network and the legacy core network, and transmit an SRVCC handover required message to an NF service provider, wherein the NF Service provider is a SRVCC Function, SRVCCF, located in the 5G Core network, which message comprises an indication that a SRVCC handover is to be prepared for the UE, the obtained transparent RAN container, the obtained information about a target ID of the legacy core network and security information for the voice session derived by the NF service consumer.

24. The NF service consumer according to claim 23, wherein the NF service consumer is further configured to:
identify, prior to transmitting the handover required message to the NF service provider and based on the information received in the handover required message, that only a transfer of voice service to the CS domain is required and that no initiating of a packet switched, PS, handover has to be performed.

25. The NF service consumer according to claim 23, wherein the NF service consumer is further configured to:
determine a target NF service provider for handling the SRVCC handover, and
transmit the handover required message to the determined NF service provider.

26. The NF service consumer according to claim 23, wherein the NF service consumer is configured to derive the security information as PS domain security information.

27. The NF service consumer according to claim 23, wherein the derived security information is a legacy CS security information for the voice session to be used by a target cell of the legacy radio access network and the NF service consumer further is configured to:
derive said legacy CS security information based on PS domain security information.

28. The NF service consumer according to claim 23, wherein the obtained transparent RAN container is a 4G or 5G target transparent RAN container or a legacy target transparent RAN container.

29. The NF Service consumer according to claim 23, wherein the NF service consumer is further configured to:
trigger a release of network resources, that are not related to the voice session, for the UE once an indication has been received that the SRVCC handover has been successfully performed.

30. A Network Function, NF, service provider in a Fifth Generation, 5G, core network, for managing Single Radio Voice Call Continuity, SRVCC, handover for a User Equipment, UE, having a voice session anchored in an IP-Multimedia Subsystem, IMS, in a packet switched, PS, domain in the 5G core network and in a 5G radio access network, wherein the SRVCC handover moves the voice session to a circuit switched, CS, domain in a legacy core network and radio access network, wherein the NF Service provider is a SRVCC Function, SRVCCF, located in the 5G Core network, a non-transitory computer-readable storage medium comprising a computer program product including instructions to cause at least one processor of the network function service provider to:

(a) receive an SRVCC handover required message from an NF service consumer, wherein the NF service consumer is an Access and Mobility Management Function, AMF, located in the 5G Core network, which message comprises:
(i) an indication that a SRVCC handover is to be performed,
(ii) information about a target ID of the legacy network, wherein the target ID indicates where the handover should be routed to within the legacy core network and radio access network,
(iii) a target transparent Radio Access Network, RAN, container comprising information required for a target radio access network node in a legacy radio access network to accept the handover,
(iv) security information for a voice session derived by the NF service consumer, and
an identifier related to the voice session and a session transfer number for SRVCC, STN-SR,
(b) obtain, based on the information received in the SRVCC handover required message, a legacy target transparent RAN container comprising information required for the target radio access network node in the legacy radio access network to accept the handover, an identifier related to the voice session, the STN-SR, and legacy CS domain security information; and
(c) initiate the handover by transmitting the obtained information to the legacy core network over an Sv-interface.

31. A Network Function, NF, service consumer, in a Fifth Generation, 5G, core network, for managing Single Radio Voice Call Continuity, SRVCC, handover for a User Equipment, UE, having a voice session anchored in an IP- Multimedia Subsystem, IMS, in a packet switched, PS, domain in the 5G core network and in a 5G radio access network, wherein the NF Service consumer is an Access and Mobility Management Function, AMF, located in the 5G Core network, wherein the SRVCC handover moves the voice session to a circuit switched, CS, domain in a legacy core network a radio access network, a non-transitory computer-readable storage medium comprising a computer program product including instructions to cause at least one processor of the network function consumer to:

(a) obtain, from a node in the 5G radio access network, a handover required message comprising an indication that SRVCC handover is to be prepared for the UE, information about a target ID of the legacy network, wherein the target ID indicates where the handover should be routed to and within the legacy core network and the radio access network, and a target transparent Radio Access Network, RAN, container comprising information required for a target radio access network node in a legacy radio access network to accept the handover;

(b) determine, based on the obtained information, that no bearer splitting is to be performed since the handover is performed towards a CS domain in the legacy radio access network and the legacy core network; and (c) transmit an SRVCC handover required message to an NF service provider, wherein the NF service provider is a SRVCC Function, SRVCCF, located in the 5G Core network, which message comprises:

(i) an indication that a SRVCC handover is to be prepared for the UE, (ii) the obtained target transparent RAN container, (iii) the obtained information about a target ID of the legacy network, (iv) security information for the voice session derived by the NF service consumer, and (v) an identifier related to the voice session and a session transfer number for SRVCC, STN-SR.

* * * * *